Oct. 19, 1926.
H. E. STRATFORD
1,603,815
AUTOMOBILE WHEEL
Filed Feb. 8, 1922
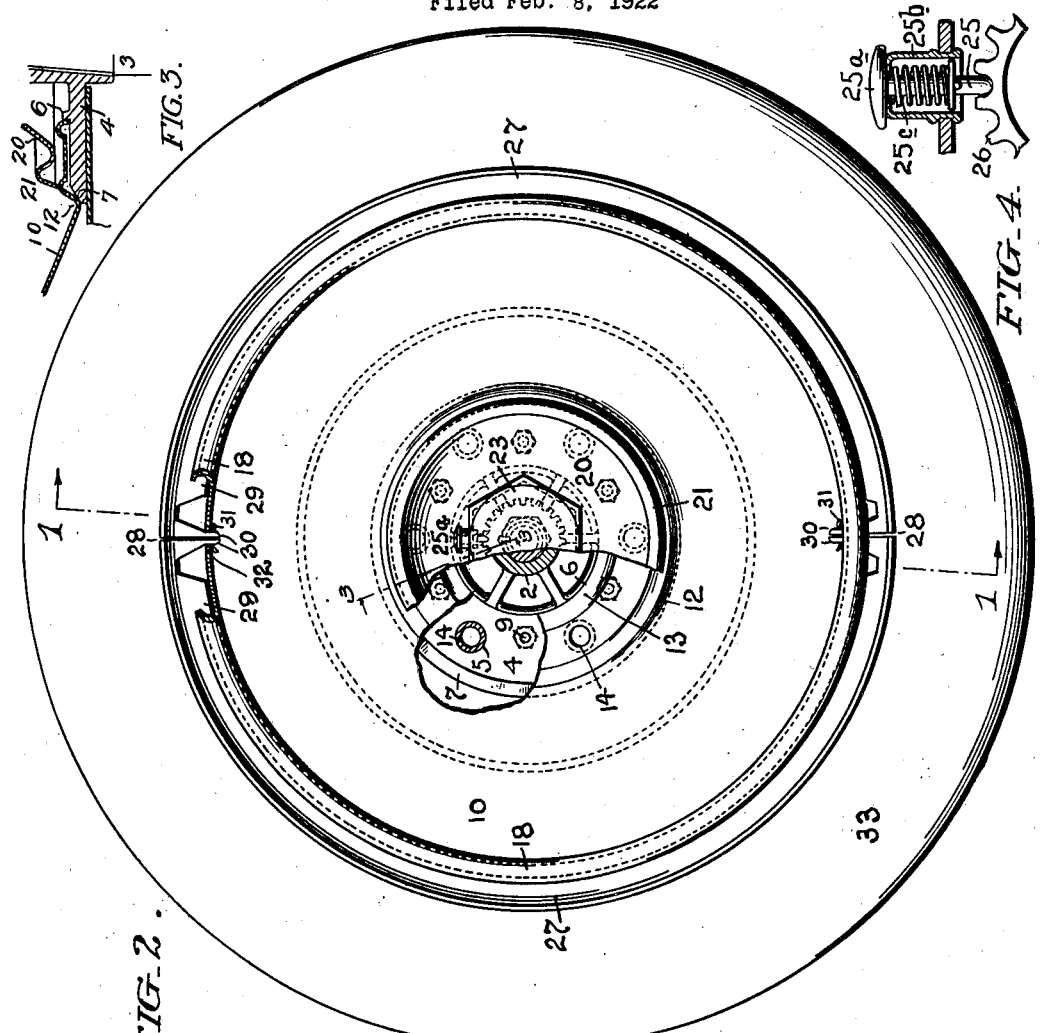
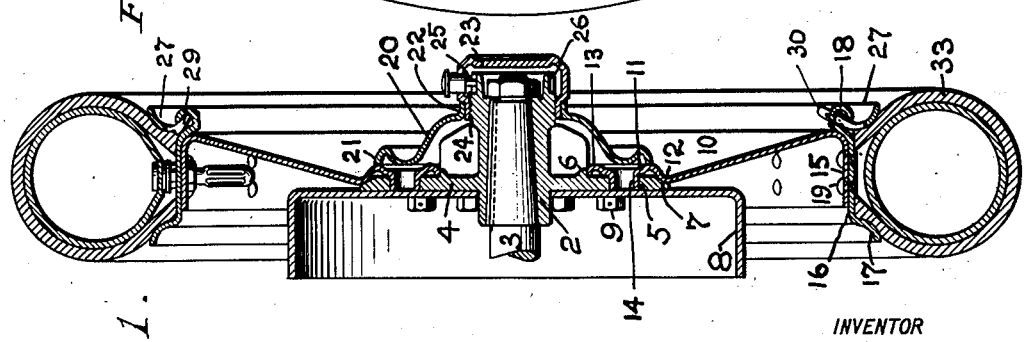
INVENTOR
Harrison E. Stratford
BY
ATTORNEY Patented Oct. 19, 1926.

1,603,815

UNITED STATES PATENT OFFICE.

HARRISON E. STRATFORD, OF ALLENTOWN, PENNSYLVANIA.

AUTOMOBILE WHEEL.

Application filed February 8, 1922. Serial No. 534,870.

My invention has for its object the construction of an all-metal wheel suitable for automobiles and other uses, especially where pneumatic or rubber tires are employed, and which shall embody strength and simplicity in its construction, be capable of being readily assembled and dismantled, and produced at moderate cost.

My object is also to provide simple and efficient rotating means and other special improvements in relation to the hub structure of the wheel and the sheet metal disk portion, whereby great strength is obtained, and a simple, positive and substantial means for driving the wheel is provided in the plane of rotation between the sheet metal disk portion and the hub proper.

My object is also to provide certain improved features in relation to the hub structure of the wheel and the sheet metal disk, especially at the beveled, bent, or otherwise angular portions, whereby the strains and shocks encountered by the wheel may be properly and more uniformly transmitted, diffused and distributed by and over the wheel, and the possibilities for injury to it greatly reduced.

My object is also to provide a simple and substantial means for quickly attaching the sheet metal disk portion of such a wheel to its hub structure, and in such manner as will enable these members to be quickly and easily dismantled.

My object is also to provide a dependable and quickly releasable locking means in relation to the hub structure of the wheel, the sheet metal disk portion and the hub cap, whereby the said disk portion, hub structure and hub cap, when assembled together, may be firmly and securely locked in position preparatory to rotating as a unit.

With the above and other objects in view, the nature of which will be more fully understood from the description hereinafter, my invention consists in the novel construction of automobile wheel, as hereinafter more fully described and defined in the claims.

Referring to the drawings: Fig. 1 is a vertical section of my improved wheel with the tire in place, taken on line 1—1 of Fig. 2; Fig. 2 is a front elevation of my improved wheel with portions broken away to show the interior construction; Fig. 3 is a sectional view taken on line 3—3 of Fig. 1; and Fig. 4 is a sectional view of a detail showing the locking means for the hub cap.

2 indicates the hub proper and may be a casting or forging of steel or other metal and securely fastened to the end of the axle 3, in any ordinary manner. This hub 2 is provided with a radial flange 4 near its inner end, and at its outer end it is provided with a screw threaded portion 24 and a circular grooved end 26. The hub may be braced by radial ribs, as shown, and which terminate adjacent to the circular rib 6 on the radial flange 4, said circular rib being of greatly less diameter than the total diameter of the radial flange. 10 is a sheet metal disk and at its outer perimeter it is flanged as at 15, the connection between said flange and the radial portion of the disk being formed by a curve of considerable radius, as will be clearly understood by reference to Fig. 4. The body part of the disk 10 is inclined inwardly toward the center, to a plane which would be substantially central through the rim and tire carried outside of the rim, as will be understood by reference to Fig. 1. At the inner end of the disk 10, the sheet metal is curved in an ogee or reverse curve forming an annular rib portion 12. From this ogee portion 12, the sheet metal extends inwardly in a radial plane 11, toward the axle 3, and parallel with but slightly clear of the outer face of the radial flange 4 as shown in Fig. 3, and terminates in an annular rib 13, whose inner end is flanged and rests against the outer face of said radial flange 4 and also against the circular rib 6 of the hub portion. Extending radially outward from the annular rib 13, the annular flat portion 11 of the sheet metal disk 10 is parallel to the outer surface of the radial flange 4 of the hub, as aforesaid; therefore the only points at which the sheet metal disk 10 bears upon the hub portion, are at or adjacent to the rib 6 and the annular rib 13 and also upon the beveled edge 7 of the flange 4. The sheet metal disk 10 is caused to rotate with the hub as a unit by means of a plurality of laterally formed tubular projections 14 which fit into corresponding apertures 5 in the radial flange 4 of the hub. In this manner there is a positive driving of the disk 10 by the rotation of the hub; and the disk is maintained in rigid contact with the flange 4 of the hub by means of a retaining collar part 20, which, at its largest diameter 21, presses upon the ogee rib portion 12 of the disk 10. The outer or smaller diameter of the retaining collar part 20 is made with an annular cylindrical flange 22 which is received upon the outer cylindrical portion of the hub cap 23, and which screws directly upon the screw threaded part 24 of the hub proper, as clearly shown in Fig. 1. It will now be understood that when the hub cap 23 is screwed upon the outer end of the hub, it directly presses upon the retaining collar 20 and clamps it tightly upon the disk 10 of the wheel, and maintains the direct connection between said disk and the radial flange 4 of the hub. The hub cap 23 may be provided with a hexagonal or other outer shape such as will permit of the application of a wrench in adjusting it. When the hub cap is properly tightened, it is locked in its adjusted position by some suitable means, and for the purpose of accomplishing this, I prefer to provide a spring detent 25 which engages grooves in a circular rack 26 on the outer circumference of the hub proper, as will be clearly understood by reference to Figs. 1 and 4.

Referring more in detail to this locking means, as shown in Fig. 5, I provide a small casing 25$^b$ which is riveted, as it were, to the hexagonal portion of the cap, and in this is placed a spring 25$^c$ which surrounds the detent plunger 25, carrying at its outer end a head portion 25$^a$ by which the detent may be withdrawn when tightening or loosening the cap, and subsequently permitted to reengage the grooves between the teeth 26. It will also be noted that these grooves are of considerable longitudinal depth, so that the hub cap may be given a number of revolutions without interfering with the capacity for the engagement of the detent therewith, as will be understood by reference to Fig. 1. Aside from the hub cap 23 acting as the immediate means for applying pressure to the retaining collar 20, it also acts as a protecting covering for the axial nut employed to hold the axle in firm relation with the hub.

The perimeter of the radial flange 4 has one of its corners beveled, as indicated at 7, and upon this annular beveled surface thus provided, the ogee bend 12 of the disk 10 directly rests, and said annular beveled surface receives the thrust and torsional strains arising in the disk when the wheel is subjected to shocks or side stresses, as when turning a corner, encountering a stone, rut or similar road obstruction, or when skidding. Furthermore, the lateral projecting annular part of the ogee portion 12 imparts rigidity to the wheel and directly takes the thrust of the retaining collar 20. It will also be seen that, referring to Fig. 1, if the strain be in the direction to the right at the bottom of the wheel, the bending stress will come upon the angular portion 21 of the retaining collar, whereas, if the strain is to the left, then the stress comes directly upon the beveled annular surface 7 of the hub flange. In any event, the ogee bend 12 in the disk provides sufficient strength and elasticity to protect the wheel from the strains and stresses as aforesaid.

Referring now to the rim portion of the wheel, it is manifest that the flange 15 may be secured directly to a wooden or other felly of any suitable construction, but in adapting my improved wheel for use with a pneumatic tire, I prefer to provide the following structure: Fitted upon the flange 15 is an annular rim portion 16 which may be secured in position by means of rivets 19, or in some other convenient manner. One side of this rim is provided with an outwardly curved flange 17, and the other side is curved inward and around, as at 18, to form an annular groove. Adjustably fitted within the annular groove are two semi-circular parts 27, abutting at 28, and constituting the clamping ring for holding the shoe 33 of the tire in position. As shown, the toes 29 of these parts 27 extend down into the groove. These semi-circular parts 27 may have their ends notched and provided with extending fingers 30 which project through a slot 32 formed through the bottom of the annular groove, and said finger portions locked in position by means of a cotter pin 31 or by some other convenient means, if desired. As soon as the inner tube is inflated, the shoe 33 presses upon the outwardly extending flange of the semi-circular ring portions 27 and upon the heel portion 29$^a$, with the result that the toe portion 29 engages the rib 18$^a$ on one side while the edge of the annular curved portion 18 receives the pressure of the semi-circular ring portion 27 at a point sufficiently distant from the toe portion as to limit the outward movement. In this manner, the tire is firmly clamped in position between the flanges 17 and 27, and the expansion of the tire firmly binds the latter rigidly in position, as indicated.

8 is the brake drum, and represents a type commonly used on motor vehicles, being in the form of a pressed sheet metal part constituting a disk shaped body and circular flange about which the brake band is placed. The brake drum herewith shown fits concentric to the hub and may rest directly against the inner face of the hub flange 4 as in Fig. 1; and may be secured to said flange by means of bolts or cap screws 9.

No claim is made in this application to the specific construction of the detachable rim retaining flange for use in association with the tire, as the same forms subject matter of my divisional application Serial No. 594,442, filed Oct. 14, 1922.

It will now be apparent that I have devised a novel and useful construction which embodies the features of advantage enumerated as desirable, and while I have in the present instance shown and described the preferred embodiment thereof which in practice has been found reliable, and to give satisfactory results, it is to be understood that I do not restrict myself to the details, as the same are susceptible of modification in various particulars without departing from the spirit or scope of the invention.

Having thus described my invention, what I claim as new and desire to secure by Letters Patent, is:—

1. In a wheel, a metal hub having a circumferential radial flange provided with a plurality of transverse apertures extending entirely through it and said flange also radially beveled around its perimeter, combined with a sheet metal disk member having an annular central portion whose general plane is radial and shaped to rest upon the outer lateral wall of said flange and having a plurality of lateral projections extending from said annular part through the transverse apertures of the hub flange and said disk member also formed with an annular ogee shape to provide a circular shoulder directly resting upon the beveled perimeter portion of the hub flange in a substantially circular line acting as a fulcrum, a retaining means having an annular abutting edge directly clamping the disk member near the ogee portion thereof whereby its circular shoulder portion is tightly pressed against the beveled perimeter of the hub flange and the projections of the disk member are held in positive engagement with the apertures in the flange, and means adjustable upon the hub for holding the retaining means in clamping position.

2. The invention according to claim 1, wherein the retaining means comprises a dome-shaped part fitting over the hub with its larger end in clamping relation with the disk member and its smaller end guided upon the hub.

3. In a wheel, the combination of a hub having a radial flange, the perimeter of which is beveled on its outer edge to provide an inclined annular surface, a disk member of sheet metal constituting the body of the wheel having a central opening and also formed with an annular ogee shape providing an annular shoulder at a distance from its central opening and also forming an annular surface portion inward from the ogee portion arranged adjacent to the outer surface of the hub flange and provided with lateral projections thereat engaging the hub flange, and wherein the annular shoulder of one circular part of the said ogee portion rests directly upon the inclined annular surface of the hub flange with a clearance on each side of it, and means secured to the hub at its outer side for causing the ogee portion of the disk to be clamped upon the inclined surface of the flange of said hub.

4. The invention according to claim 3, wherein further, the inner annular surface part of the disk is slightly separated from the hub flange except for the contact of the lateral projections and the ogee portion, and the means for clamping the ogee part of the sheet metal disk to the flange of the hub comprises an annular shaped metal retaining member forming a cup having its larger and inner end alone resting directly upon the central annular portion of the sheet metal disk adjacent to the ogee portion thereof and extending over the lateral projections.

In testimony of which invention, I hereunto set my hand.

HARRISON E. STRATFORD.